P. VAN ANTWERP.
CHURN DASHER.
No. 2,957. Patented Feb. 16, 1843.
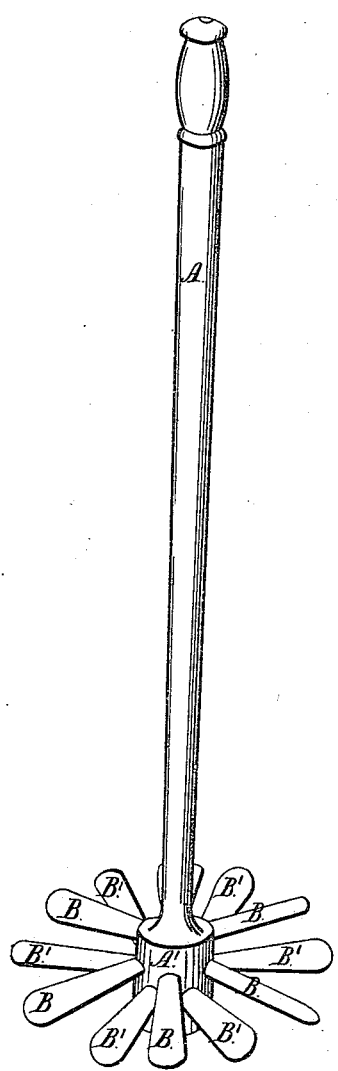

UNITED STATES PATENT OFFICE.

PETER VAN ANTWERP, OF COEYMANS, NEW YORK.

CHURN-DASHER.

Specification of Letters Patent No. 2,957, dated February 16, 1843.

*To all whom it may concern:*

Be it known that I, PETER VAN ANTWERP, of Coeymans, county of Albany, State of New York, have invented a new and useful Improvement in Dashers of Churns, which I denominate "Van Antwerp's Reacting Churn-Dasher," of which the following is a full and accurate description, reference being had to the accompanying drawing, making part of this specification.

A A' is the vertical rod or handle of the common churn or hand dasher which may be of any required height. About three inches more or less (according to the size of the dasher) of its lower end is of an enlarged diameter forming a kind of cylindrical knob, shown at A' in the drawing, around which I arrange two series of radial buckets or paddles B B', one series being placed over the other, for the purpose of agitating the cream. These paddles resemble in construction the oars employed for propelling boats, being broad and flattened at their outer ends where they project into the cream, tapering from thence to their inner ends, where they are adapted to openings in the cylindrical knob A' hereafter described. The manner of arranging these paddles is as follows: Around the knob A' and at equal distances from its upper end I make a series of holes extending from the surface to the center of said knob intersecting a hole which I bore in said center, the number of these holes depending on the number of paddles employed. These openings are made in a direction inward and upward so that when the paddles B are in place their outer ends are depressed as shown in the drawing instead of standing out at right angles with the axis of the cylinder A'. I make the same number of openings also around the cylindrical knob A' near its lower end, at equal distances from this end and adapt to them the paddles B'. These are not placed immediately below the holes in the upper series but are arranged below the spaces intervening between each of the upper apertures or paddles in such a manner that a perpendicular let fall from each of the upper holes would pass through the spaces intervening between each of the lower ones. These lower apertures are made in a reverse direction to the former ones, viz, inward and downward to the opening made in the center of the cylindrical knob A' so that the outer ends of the paddles adapted to these openings are when in place elevated to the level of the outer ends of the upper paddles, as shown in the drawings, where owing to the oblique direction of the openings in which the paddles B B' are inserted the outer ends of the paddles B are represented as depressed and the outer ends of paddles B' elevated to the same horizontal position.

The inner ends of the paddle B are fitted in the upper openings so as to stand shelving, that is, in such a manner as to give the blade of the paddle an oblique position, the upper face of each of these paddles looking obliquely upward and in the same direction so as to elevate one edge of the paddle at about an angle of 45° above the other, as shown in Figure 1, where the upper face or surface of each of the paddles B is turned obliquely toward the right so as to elevate the left edge of the paddle in the manner specified. The paddles B' are also inserted obliquely in their apertures—that is, with the upper face or surface of each turned obliquely upward but in a different direction as represented in the drawing where the upper face of each of the lower paddles B' is turned obliquely toward the left elevating the right edge of the paddle at about an angle of 45° above the other one.

This mode of constructing the dasher gives it great advantage over the ordinary churn dasher as by the employment of paddles arranged in the manner stated no vacuum is created interfering with the operation of the churn, consequently there is no mingling of air with the cream to obstruct the gathering of the butter; owing to the manner in which the paddles are arranged a reaction is also produced in the cream as it is impelled in one direction by the paddles B in the upper series and in the opposite direction by the paddles B' in the lower series.

The hole in the center of the cylinder A' may be filled, after the paddles are in place, with cement or putty and its end closed by a piece of cork or other elastic substance projecting a sufficient distance below the end of the cylinder A' to touch the bottom of the churn when the dasher is used diminishing by its elasticity the force of the stroke given by the dasher to the bottom of the churn preventing it by this means from being bruised.

The dasher so constructed is operated like the common hand dasher and is to be employed in the ordinary vertical churn in the same manner that the common hand dasher is used.

Having described my improvement in the mode of constructing the dashers of churns, what I claim as my invention and desire to secure by Letters Patent is—

Combining with the rod or stem A, A' of the dasher, the series of paddles B B' arranged above each other as described and operating, in the manner set forth.

PETER VAN ANTWERP.

Witnesses:
ABRAHAM VERPLANK,
HANZ TEFFT.